June 6, 1944.  V. HAIGH  2,350,506
TRANSMISSION
Original Filed May 31, 1940  2 Sheets-Sheet 1
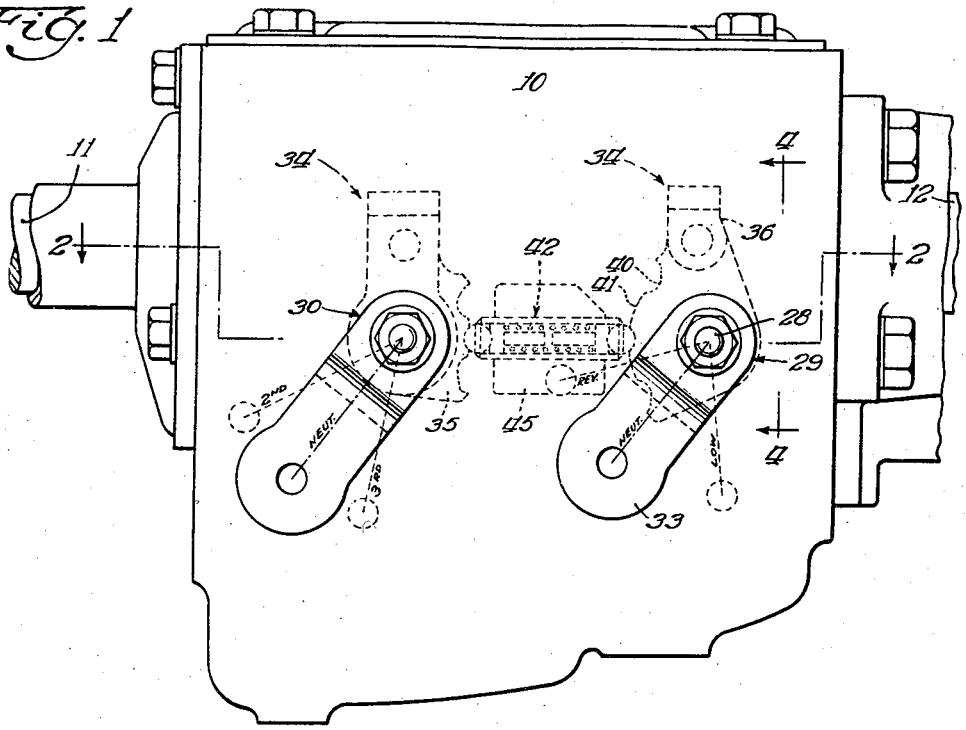
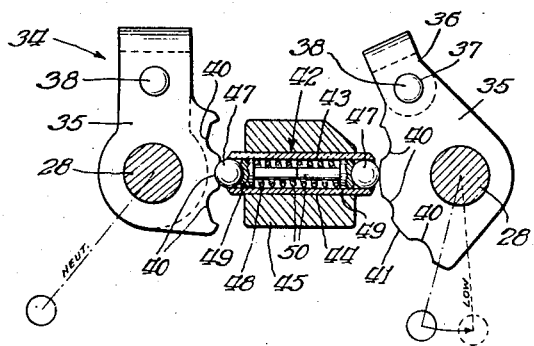
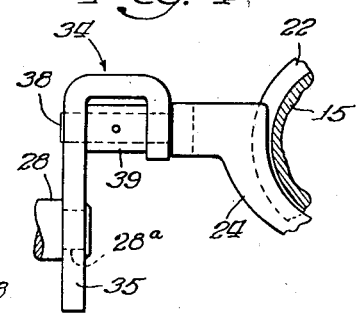
Vaughn Haigh
INVENTOR.
BY Edward C. Fitzbaugh
Atty.

June 6, 1944.   V. HAIGH   2,350,506
TRANSMISSION
Original Filed May 31, 1940   2 Sheets-Sheet 2

Vaughn Haigh
INVENTOR.
BY Edward C. Fritzbaugh

Patented June 6, 1944

2,350,506

UNITED STATES PATENT OFFICE 2,350,506

TRANSMISSION

Vaughn Haigh, South Bend, Ind., assignor to Borg-Warner Corporation, Chicago, Ill., a corporation of Illinois Original application May 31, 1940, Serial No. 338,176, now Patent No. 2,317,761, dated April 27, 1943. Divided and this application March 26, 1943, Serial No. 480,631

5 Claims. (Cl. 74—477)

This invention relates to change speed transmissions of the type employed in motor vehicles and deals particularly with mechanism of the type controlled from the steering column for shifting the gears and jaw clutch torque transmitting elements thereof.

A transmission of this type usually incorporates a pair of cranks extending through the side wall of the transmission case, provided at their outer ends with lever arms that are connected to linkage coming from the steering column control mechanism, and, provided inside of the case with crank arms which carry shifting forks for engaging the slidable torque transmitting elements. It is also customary to associate with such crank levers, an interlock device which permits said levers to be shifted only one at a time.

One object of the present invention is to provide a shifting mechanism of the type indicated above, which is of improved and simplified construction and relatively inexpensive to manufacture.

To this end, the invention contemplates, in general, a pair of cranks each having an inner crank arm in the form of a yoke including in one region a sector forming part of the interlock mechanism and in another region a sturdy pivotal support for a shifting fork.

Another object of the invention is to provide an improved interlock device serving the double function of preventing simultaneous shifting of both levers and yieldably holding the levers in their various selective positions.

This application is a division of my co-pending application, Serial No. 338,176, filed May 31, 1940.

Other objects, the advantages and uses of the invention will become more apparent after reading the following specification and claims, and after consideration of the drawings forming a part of the specification, wherein:

Fig. 1 is a side elevation of a transmission embodying the invention;

Fig. 3 is a detail vertical sectional view of the interlock mechanism taken as indicated by the line 3—3 of Fig. 2; and Fig. 4 is a detail transverse vertical sectional view of one of the crank levers and associated parts taken as indicated by the line 4—4 of Fig. 1.

Figure 2:
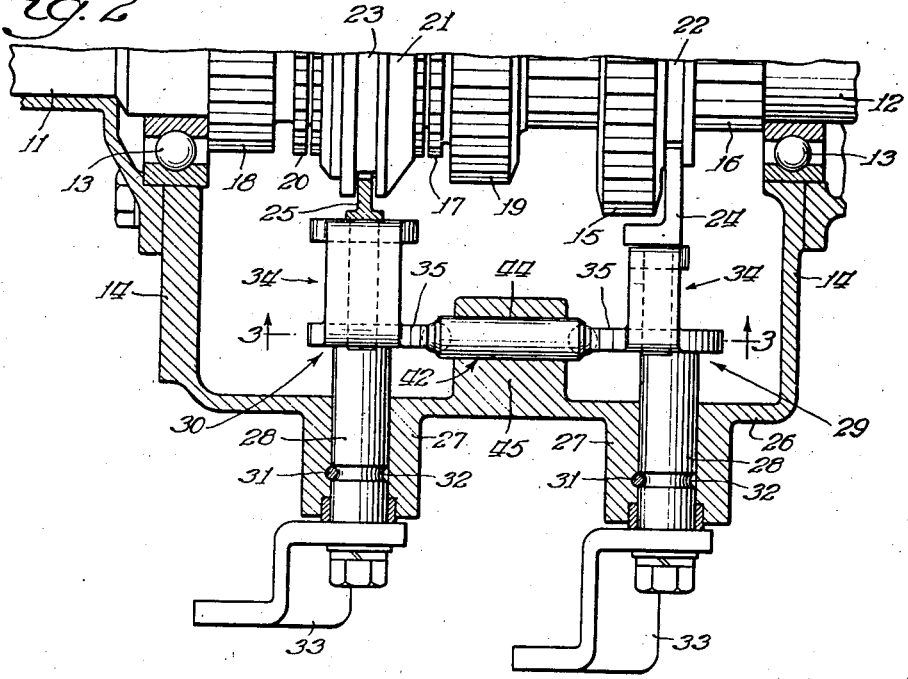
Fig. 2 is a horizontal longitudinal sectional view thereof taken as indicated by the line 2—2 of Fig. 1.

As an example of one form in which the invention may be embodied, I have shown in Figs. 1 to 4 inclusive, a motor vehicle transmission including a case 10, a drive shaft 11, and tail shaft 12 journaled in bearings 13 in the end walls 14 of the case 10, a combined low and reverse gear 15 axially slidable upon a splined section 16 of the driven shaft 12, an intermediate clutch element 17 rotatable on the driven shaft 12 and driven at a reduced ratio from the driving shaft 11 through reduction gearing including the gears 18 and 19 attached to the shaft 11 and clutch element 17 respectively, a direct drive clutch element 20 on the drive shaft 11, and a shiftable positive jaw clutch sleeve 21 adapted to transfer the drive from the second speed clutch element 17 or the direct drive clutch element 20 to the driven shaft 12 to which the sleeve 21 is drivingly connected.

The gear 15 and clutch sleeve 21 are provided respectively with annular channels 22 and 23 in which are engaged the shifting forks 24 and 25.

In the side wall 26 of the transmission case is a pair of bearing bosses 27 in which are journalled the shaft portions 28 of the shifting cranks 29 and 30 respectively. The shafts 28 are positioned against endwise movement by keys 31 mounted in the bosses 27 and engaged in annular grooves 32 in the respective shafts.

To the outer ends of the shafts 28 are secured operating levers 33 which are connected, by linkage (not shown) to the steering post control mechanism.

To the inner ends of the shafts 28 are secured crank arms 34 to which the forks 24 and 25 are pivoted. The crank arms 34 (Fig. 3) are heavy sheet metal stampings, each comprising a sector portion 35 into which the reduced end 28a of a respective shaft 28 is riveted as indicated in Fig. 4, and a yoke portion 36 the respective sides of which are provided with openings 37 in which the shaft 38 of the corresponding fork 24 or 25 is journalled. A sleeve 39, secured at its ends, as by welding, to the respective sides of the yoke, forms a strut for stiffening the yoke.

Each sector 35 is formed with notches 40 respectively separated by high regions 41 of the sector peripheries. The notches 40 are located in the adjacent peripheral regions of the sector, and cooperate with a combined interlock and yieldable positioning poppet device 42. The interlock device 42 comprises a tube 43 slidably mounted in a bore 44 in a boss 45 formed on the side wall 26 of the transmission case. Within the sleeve in the end regions thereof are a pair of balls 47. The balls 47 are engageable in the notches 40 and are yieldingly urged outwardly by means of a coil spring 48. Engaged between the ends of the coil spring 48 and the balls 47 are the heads 49 of a pair of abutment elements having stems 50 extending toward each other within the spring 48.

The stems 50 are of such length as to permit one of the balls 47 to ride upon a high region 41 of its coacting sector so as to permit the corresponding crank to be oscillated for shifting one of the torque transmitting elements. When engaged in a central notch 40, a ball 47 will hold the corresponding crank in neutral position. When engaged in either of the side notches 40, the ball 47 will yieldingly hold the crank in a position to establish a drive through the transmission.

When one of the cranks is being shifted, the corresponding ball 47 will be moved inwardly as the high region 41 of the sector rides against it, and the stems 50 of the abutment elements are of such length that they will then engage so as to form, together with the balls 47, an unyieldable column between two sectors with the opposite ball 47 bottomed in one of its coacting notches 40 so as to prevent shifting of the other crank. Thus it is impossible to simultaneously shift both cranks.

The invention contemplates the employment of a conventional type of control mechanism of such character that when the shifting of a given crank has progressed to the point indicated in Fig. 3, it will be impossible for the shifting lever to engage the linkage leading to the other crank without first coming back to a neutral position.

While I have described my invention in connection with one specific embodiment thereof, it is to be understood that this is by way of illustration and not by way of limitation and the scope of the invention is defined solely by the appended claims which should be construed as broadly as the prior art will permit.

I claim:

1. In a transmission having a plurality of torque transmitting members to be shifted, a pair of elements connected with said members for effecting the shift of the members, each of said elements being formed with a plurality of notches, and interlock means adapted to cooperate with said notches and including a poppet device, said poppet device comprising a part provided with a cylindrical cavity, a pair of balls in the end regions of said cavity and adapted to project therefrom for engagement in said notches, a pair of plungers in said cavity each acting on one of said balls, spring means in said cavity adapted to yieldingly urge said plungers and thereby said balls apart for simultaneous seating in notches of both said elements, and abutment means provided on said plungers adapted to bear against each other to allow one of said balls to be moved inwardly of said cavity to ride over a region of one of said elements between two notches therein while the other ball remains seated in its respective notch, and, when the balls are in the positions just described, to form together with the balls an unyieldable column between the elements maintaining the seated ball in engagement with its notch so as to prevent movement of its corresponding element.

2. In a transmission having a plurality of torque transmitting members to be shifted, a pair of cranks for effecting the shift of said members, interlock means including a sector connected with each crank to move therewith, each sector having a plurality of peripheral notches defining between them a high region of the sector periphery, and a poppet device disposed to act on both of said sectors, said poppet device including a part provided with a cylindrical cavity, a pair of balls in the end regions of said cavity and adapted to project therefrom for engagement in said notches, a pair of plungers in said cavity each acting on one of said balls, and a coil spring in said cavity acting on said plungers and adapted to yieldingly urge the plungers and thereby said balls apart for simultaneous seating in notches of both sectors, said plungers being provided with abutment means adapted to bear against each other to allow a movement of the plungers and thereby the balls together against the action of said spring to permit one ball to ride over a high region of a sector periphery while the other ball remains seated in its respective notch and to prevent further movement of the plungers and balls together whereby when the balls are in the positions just described the abutment means forms together with the balls and plungers an unyieldable column between the sectors maintaining the seated ball in engagement with its notch so as to prevent oscillation of its corresponding crank.

3. In a transmission having a plurality of torque transmitting members to be shifted, a pair of cranks for effecting the shift of said members, interlock means including a sector connected with each of said cranks to move therewith, each sector having a plurality of peripheral notches defining between them a high region of the sector periphery, and a poppet device disposed to act on said sectors, said poppet device including a part provided with a cylindrical cavity, a pair of balls in the end regions of said cavity and adapted to project therefrom for engagement in said notches, a pair of plungers in said cavity each acting on one of said balls, said plungers each comprising a head portion in contact with one of said balls and a stem portion, a coil spring in said cavity between the head portions of said plungers and disposed about said stem portions and adapted to yieldingly urge said plungers and thereby said balls apart for simultaneous seating in notches of both sectors, said stem portions being of such length as to provide a gap between them when the balls are in their extended positions and allowing one of the balls to be moved inwardly of the cavity to ride over a high region of a sector periphery whereby the ends of the stem portions are brought together while the other ball remains seated in its respective notch, said stem portions forming together with the balls and head portions, when the balls and plungers are in the positions just described, an unyieldable column between the sectors maintaining the seated ball in engagement with its notch so as to prevent oscillation of its corresponding crank.

4. In a transmission having a plurality of torque transmitting members to be shifted, a pair of cranks for effecting the shift of said members, interlock means including a sector forming part of each crank, each sector having a plurality of peripheral notches defining between them a high region of the sector periphery, and a poppet device mounted for sliding movement on a fixed axis which lies in the plane of the sectors and intersects the sector axes, said poppet device including a sleeve, a pair of balls engaged in the end regions of said sleeve and projecting therefrom for engagement in said notches, a pair of plungers in said sleeve each acting on one of said balls, said plungers being provided with abutment elements adapted to contact when the plungers are moved together with the plungers when so in contact having a total length that is less than the distance between the balls when the latter are both in their extended positions whereby one ball may be moved inwardly of the sleeve to ride over a high region of a sector periphery while the other ball remains seated in its respective notch and whereby when the abutment elements are so in contact the balls and plungers may form an unyieldable column maintaining the seated ball in engagement in its notch preventing oscillation of its corresponding crank, and spring means in said sleeve acting on said plungers to yieldingly urge the plungers and thereby said balls apart for simultaneous seating in notches of both of said sectors.

5. In a transmission having a case and a plurality of torque transmitting members to be shifted, a pair of cranks for effecting the shift of said members, each of said cranks including a shaft journalled in said case and a unitary stamped sheet metal crank arm of generally U-shape including a pair of side arms and a connecting web, one of said side arms of each of said cranks being mounted on one of said shafts at the end of the arm opposite said web portion, a shift fork for each crank comprising a shaft portion extending between and journalled in said side arms adjacent said web and a forked portion cooperating with a member to be shifted, one side arm of each crank arm being formed with a sector portion, said sector portions each having a plurality of peripheral notches defining between them a high region of the sector periphery, and a poppet device disposed to act on both of said sectors, said poppet device including a part provided with a cylindrical cavity, a pair of balls in the end regions of said cavity and adapted to project therefrom for engagement in said notches, a pair of plungers in said cavity each acting on one of said balls and spring means in said cavity adapted to yieldingly urge said plungers and thereby said balls apart for simultaneous seating of the balls in notches of both sectors, said plungers being provided with abutment means whereby one ball may be moved inwardly of the cylindrical cavity to ride over a high region of a sector periphery while the other ball remains seated in its respective notch, and when the balls are in the positions just described forming together with the balls an unyieldable column between the sectors maintaining the seated ball in engagement with its notch so as to prevent oscillation of its corresponding crank.

VAUGHN HAIGH.